(12) United States Patent
Tovino et al.

(10) Patent No.: US 10,027,670 B2
(45) Date of Patent: *Jul. 17, 2018

(54) DISTRIBUTED AUTHENTICATION

(71) Applicant: SHORETEL, INC., Sunnyvale, CA (US)

(72) Inventors: Michael S. W. Tovino, Bend, OR (US); Amy S. Pendleton, Austin, TX (US)

(73) Assignee: Mitel Networks, Inc. DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/586,973

(22) Filed: May 4, 2017

(65) Prior Publication Data
US 2017/0237740 A1    Aug. 17, 2017

Related U.S. Application Data

(63) Continuation of application No. 14/590,418, filed on Jan. 6, 2015, now Pat. No. 9,699,167.

(51) Int. Cl.
| | |
|---|---|
| *H04L 29/06* | (2006.01) |
| *H04L 9/08* | (2006.01) |
| *H04L 9/32* | (2006.01) |
| *G06F 9/44* | (2018.01) |
| *G06F 9/4401* | (2018.01) |
| *H04L 29/08* | (2006.01) |
| *G06F 21/57* | (2013.01) |

(52) U.S. Cl.
CPC .......... *H04L 63/10* (2013.01); *G06F 9/4401* (2013.01); *G06F 21/57* (2013.01); *H04L 9/0861* (2013.01); *H04L 9/32* (2013.01); *H04L 9/3247* (2013.01); *H04L 63/0428* (2013.01); *H04L 63/0807* (2013.01); *H04L 67/16* (2013.01); *H04L 67/10* (2013.01); *H04L 67/18* (2013.01)

(58) Field of Classification Search
CPC ... H04L 63/10; H04L 63/0807; H04L 9/0861; H04L 9/3247; H04L 63/0428; G06F 9/4401

See application file for complete search history.

(56) References Cited

U.S. PATENT DOCUMENTS

| | | | | |
|---|---|---|---|---|
| 5,689,566 | A * | 11/1997 | Nguyen | H04L 29/06 380/29 |
| 7,765,396 | B2 * | 7/2010 | Haufe | G06F 21/606 713/155 |
| 8,010,783 | B1 * | 8/2011 | Cahill | H04L 63/10 713/155 |

(Continued)

*Primary Examiner* — Yonas Bayou

(57) ABSTRACT

A method can include receiving a request from a requestor to a given resource, which requestor is registered to access a set of one or more resources. The request includes a ticket that includes signature data generated by an authenticating entity in response to authenticating the requestor. The signature data may be decrypted to provide a decrypted signature. The ticket may be validated in response to the request based on evaluating the decrypted signature. A response can be provided to the requestor based on the validation, and the response can grant the requestor access to the given resource if the validation determines the ticket to be authentic and authorized for the given resource or the response can deny the requestor access to the given resource if the validation determines to reject the ticket.

16 Claims, 6 Drawing Sheets

(56) References Cited

U.S. PATENT DOCUMENTS

| | | | |
|---|---|---|---|
| 2008/0183623 A1* | 7/2008 | Xu | G06Q 30/0284 705/51 |
| 2012/0110337 A1* | 5/2012 | Murphey | G06F 21/10 713/182 |
| 2013/0039360 A1* | 2/2013 | Manian | H04L 12/589 370/352 |
| 2013/0080768 A1* | 3/2013 | Lagerway | H04L 9/321 713/155 |
| 2013/0318344 A1* | 11/2013 | Brown | G06Q 10/107 713/158 |
| 2014/0317398 A1* | 10/2014 | Betz | H04L 63/0428 713/155 |
| 2014/0351579 A1* | 11/2014 | Leggette | H04L 63/06 713/156 |
| 2015/0058619 A1* | 2/2015 | Sweet | G06F 21/55 713/155 |
| 2015/0085619 A1 | 3/2015 | Jeong et al. | |
| 2015/0215128 A1* | 7/2015 | Pal | H04L 9/3228 713/155 |

\* cited by examiner

DISTRIBUTED AUTHENTICATION

CROSS REFERENCE TO RELATED APPLICATIONS

The present application is a Continuation of U.S. patent application Ser. No. 14/590,418, filed Jan. 6, 2015, entitled "DISTRIBUTED AUTHENTICATION", which is incorporated by reference herein in its entirety.

TECHNICAL FIELD

This disclosure relates generally to authentication of a requestor in a distributed manner.

BACKGROUND

Hybrid cloud computing relates to a composition of two or more clouds (private, community or public) that remain unique entities but are bound together, offering the benefits of multiple deployment models. Such composition can expand deployment options for cloud services, allowing IT organizations to use public cloud computing resources to meet certain needs. By utilizing "hybrid cloud" architecture, companies and individuals are able to obtain degrees of fault tolerance combined with locally immediate usability without dependency on internet connectivity. Hybrid cloud architecture can include two or more clouds (e.g., private, community or public) that remain distinct entities but are bound together, thereby offering the benefits of multiple deployment models.

SUMMARY

This disclosure relates generally to distributed authentication that can be utilized to access resources.

One example can provide a method that includes receiving a request from a requestor to a given resource, which requestor is registered to access a set of one or more resources. The request includes a ticket that includes signature data generated by an authenticating entity in response to authenticating the requestor. The signature data may be decrypted to provide a decrypted signature. The ticket may be validated in response to the request based on evaluating the decrypted signature. A response can be provided to the requestor based on the validation, and the response can grant the requestor access to the given resource if the validation determines the ticket to be authentic and authorized for the given resource or the response can deny the requestor access to the given resource if the validation determines to reject the ticket.

Another example provides a system that includes an authenticator programmed to receive an authentication request from a requestor. The authentication request can specify credentials for the requestor. The authenticator may authenticate the requestor based on the credentials for the requestor and provide the requestor a response that includes a ticket redeemable for accessing resources operating in a hybrid system. The ticket may include payload data and a signature generated by the authenticator. A ticket evaluator associated with a given resource of the resources can operate in the hybrid system. The ticket evaluator may be programmed to evaluate and validate the ticket provided in a request from the requestor to access the given resource, and the given resource may grant access to the requestor in response to the ticket evaluator validating the ticket from the requestor based on validation data for the given resource.

As yet another example, a method may include subscribing to access at least one hosted resource from a premise system. The method can also include registering an authenticator operating within the premise system with the at least one hosted resource according to the subscription, the registering including providing public key data of the authenticator to the at least one hosted resource. The method can also include receiving an authentication request from a requestor at the authenticator, the authentication request including credentials of the requestor. The method can also include generating a ticket in response to authenticating the requestor based on the credentials of the requestor. The ticket may include payload data and a signature that is generated by applying a private key of the authenticator, where the public key and the private key of the authenticator define a key pair. The method can also include providing a response to the requestor that includes the ticket redeemable for accessing the at least one hosted resources.

DETAILED DESCRIPTION

Figure 1:
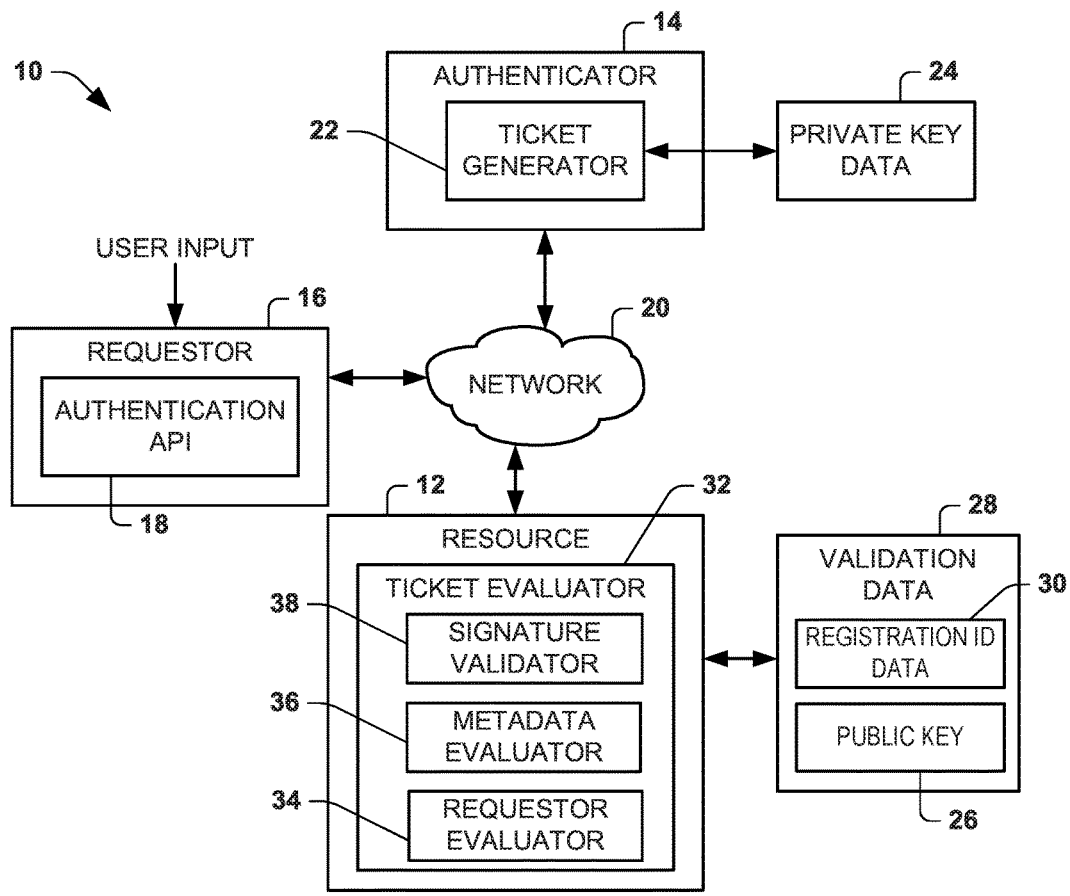
FIG. 1 depicts an example of a system to provide for distributed authentication of resources.

This disclosure relates generally to distributed authentication that can be utilized to access resources.

As an example, a requestor can exchange credentials for a ticket issued by an authenticating entity. The authenticating entity can generate the ticket to include a signature (e.g., a digital signature) and validation parameters. The requestor can be bound to a set of one or more resources (e.g., hardware and/or software) via registration, such that the ticket can be redeemed to access such resources. For instance, the requestor can send a request that includes the ticket to a given resource. In response, the given resource can accept or reject the ticket based on an evaluation of the request, including the ticket. The request evaluation can include analyzing content (e.g., payload) of the ticket to determine whether to reject the ticket. For instance, the request evaluation can also include validating the signature in the ticket that was generated by the authenticating entity (e.g., that the payload has not been tampered with). A response can be provided to the requestor to reject or accept the ticket and in turn provide access to the given service based on the evaluation of the request.

Additionally, a given ticket can be redeemed by any number of one or more different resources, which can be managed by one or more distinct entities. For example, the entities can include a premise system that is separate from a hosted system to provide a hybrid cloud system. In hybrid cloud system, for example, a ticket redeeming resource can reside in a premise system or the resource can be a hosted resource (e.g., in a computing cloud) that is outside of the premise system. As a further example, systems and methods disclosed herein can employ more than one authenticator, which can include premise authenticator as well as cloud authenticator. Premise authenticators can accept premise credentials from a requestor and generate tickets that can be used on both premise and hosted systems. Cloud-based authenticators can accept credentials from the requestor for cloud authentication and generate tickets that can be redeemed by hosted resources provided in the cloud and/or premise-based resources.

As another example, the resources and authenticators can be implemented and managed by distinct entities in a peer-to-peer system, where each system can register with each other to enable cross-utilization of resources by presenting a ticket for accessing resources within one or more other system. The use of the ticket in such a peer-to-peer implementation provides a scalable and simple identity management process, which may be used between data centers or customer enterprises, for example.

The ticket can be transparent, transparent meaning it can be evaluated and recognized without contacting the issuing authenticator of the ticket. This is because, in some examples, the authentication and validation occur in a closed hybrid system (e.g., in a unified communications system), such that the distributed authentication (even without checking back with the authenticator that issued the ticket) and subsequent ticket evaluation can be sufficient to proceed with granting the requestor access to system resources. The transparency of the ticket thus enables a user's enterprise network credentials to be used to securely access cloud services and resources, without having to allow the cloud services and resources access to sensitive data on the enterprise network (e.g., within the firewall).

FIG. 1 depicts a schematic example of a system 10 that provides for distributed authentication of one or more system resources 12. The system 10 includes one or more authenticators 14 programmed to accept credentials from one or more requestors 16 and to generate a corresponding ticket. For example, a requestor 16 can employ an authenticator application programming interface (API) 18 to submit requestor credentials and associated parameters to the authenticator 14. The parameters can include attributes of the user as well as resource metadata (e.g., an identification of resources that the user may desire to access and/or the type or level of access that is desired), which metadata may be passed from the request into ticket metadata, for example. It is understood that the requestor may employ any number of authenticator APIs to exchange information with respective authenticators. The requestor 16 employs the authenticator API 18 to submit its credentials for a ticket to enable the requestor to access one or more system resources 12 to which the requestor has been registered.

As an example, a user authorized to administer the resources (e.g., the requestor or another entity operating on its behalf) can send predetermined registration data that can be used by each resource. The registration data can describe the identity and/or other properties of each of a plurality of users (e.g., persons, hardware and/or software) authorized to utilize the resource 12. For instance, the registration data can specify a level of services or capabilities that are authorized for each user with respect to the resource 12.

As an example, registration data can be sent to the cloud, via a secure communications link through the network 20, for the plurality of users (e.g., persons, hardware and/or software) to provision the resources in the cloud for each of the plurality of users. For resources hosted in a cloud, the registration process can include a business transaction that involves a subscription for contracted resources (e.g., hardware and/or software services) and, as appropriate, payment for such resources. In this way, the identity of each requestor that is provided in a given ticket can be tightly integrated with (e.g., bound to) a particular set of resources to which the requestor has been registered. As disclosed herein, a given requestor thus can be registered to use resources in a premise-based system, in a hosted system or hybrid of both premise resources and hosted resources. As one example, the registration of the requestor for one or more resources may be implemented as part of a process for configuring hosted resources for use by users in a premise-based system, such as disclosed in U.S. patent application Ser. No. 14/011,787 filed 28 Aug. 2013 and entitled HYBRID COMMUNICATIONS SYSTEM AND METHOD OF OPERATION, which is incorporated herein by reference.

In the example of FIG. 1, the resource 12 thus can correspond to a resource that is implemented in a premises system (e.g., residing behind a firewall with the requestor) or hosted in a cloud. In the example of a hybrid unified communication (UC) system in which resources operate in a multi-tenant hosted system, the one or more resources may include a mobility router service, a fax service, a voicemail transcription service, a hosted conferencing bridge, a hosted instant messaging server, a hosted contact center and/or other communications service hosted as part of the multi-tenant hosted system.

As mentioned, access and the level of access to the resource 12 by the requestor 16 can be established based on the ticket provided by the authenticator 14 to the requestor. The authenticator 14 can include a ticket generator 22 programmed to generate the ticket that can include payload data and a corresponding signature. The payload portion can include validation parameters (see, e.g., FIG. 2). As an example, the ticket generator 22 can employ an encryption algorithm to generate the signature based on a private key 24 that is associated with the authenticator 14. In some examples, the ticket generator 22 can encrypt a selected portion of the ticket (e.g., payload data) or the entire ticket that has been generated. For instance, the ticket generator 22 may hash the payload data and the hash can be encrypted using the authenticator's private key and a selected cryptographic algorithm to generate the signature, which can be provided as part of the ticket. In some examples, the authenticator 14 can encrypt the entire ticket, including the payload provided in the response to the requestor 16. In other examples, the payload itself can be provided as a string that is unencrypted and combined with the signature that is generated in the response to the requestor.

A corresponding public key for the authenticator can be provided to each resource to which the ticket can be redeemed. That is, the private key can be associated with its public key as a key pair. In the example of FIG. 1, the public key can be stored as public key data 26 in associated validation data 28 that is utilized by the resource 12 for cryptographic validation of the ticket as disclosed herein. For instance, the public key for the authenticator 14 can be provided to each resource 12 as part of a configuration file via a secure communication link. By providing the public key to any number of one or more resources 12, the ticket generated by the authenticator 14 can be redeemed by various resources 12 throughout the system.

As a further example, the requestor 16 can provide the authentication request to the authenticator 14 as part of an authentication procedure. The requestor credentials and the format that they are provided to the authenticator 14 can vary according to the type of requestor and the implementation of the authenticator 14. As one example, the authentication request can be implemented as part of a login procedure in which a user name and password are provided in response to a user input at the requestor 16. As another example, the requestor (e.g., a hardware and/or software device) 16 can automatically provide the authentication request and associated credentials stored therein to the authenticator 14. That is, certain types of requestors (e.g., phones or other hardware) can employ an authenticator API that is hardcoded with one or more uniform resource indicators (URI) to enable authentication via the authenticator 14.

Different authenticators 14 may support one or more protocols to accommodate the different authentication procedures that requestors may implement to obtain tickets for use in the system 10. As one example, the authenticator 14 can be programmed to accept the requestor credentials via an http(s) POST request, which may involve other protocols such as Integrated Windows Authentication, Kerberos, and NT LAN manager (NTLM) to name a few. For instance, the requestor (e.g., a user) can provide its credentials as part of a single sign on procedure to enable access to multiple related, but independent software systems without requiring to log in again at for each system (e.g., using Lightweight Directory Access Protocol (LDAP)).

As disclosed herein, the system 10 can be implemented as a hybrid system that includes a premise-based system as well as one or more hosted systems (also referred to herein as a cloud). For example, the hosted (e.g., cloud) system can be include a variety of hardware and/or software resources that can be supported in a given cloud, including servers, branch exchanges, routers and databases. For instance, such resources can include processors, memory, servers, software, applications, that cooperate to provide cloud computing capabilities for users and premises based systems that desire to exploit cloud resources that enhance existing functionality of their premises based system. By way of example, each of a plurality of users of the premise-based system thus can be provisioned individually or as part of a respective group by providing registration data to utilize the hosted resources.

Additionally, as used herein, a premise-based system refers to a private network that is administered and/or operated by or on behalf of a private entity (e.g., a company, group of users, or other service provider) that is different from the entity operating the hosted, cloud-based system. The premises based system can be implemented locally at a single site or it can be distributed across multiple sites but operated as a single enterprise, such as an enterprise unified communication (UC) system. The resources operating in the premise-based system can be separated from the hosted system by a firewall.

By way of example, where the authenticator 14 resides on premises such as behind a firewall, the requestor 16 can communicate with the authenticator via secure or unsecure communication link such as part of the network 20. For the example of a premise-based authenticator 14, the public key for the authenticator can be provided to the resources 12 as part of a configuration file. For hosted resources, the configuration file can also include registration data for the premise-based system, and the configuration file can be provided to hosted resources via a secure communication link. In other examples, the authenticator 14 can reside outside of the firewall through which the requestor accesses the authenticator and sends the authentication request. In this example, the secure communication link between the requestor 16 and the authenticator 14 can occur via the network 20 over a secure link, such as HTTPS or a secure tunnel. The protocol used by the requestor 16 to provide a request for service with the ticket to the resource 12 can vary according to the configuration of the resource and the configuration of the requestor. For example, the requestor can provide the ticket as an HTTP header. The header can be encoded. In other examples, the ticket can be passed as a cookie to the resource such as when the resource 12 corresponds to a web service.

The resource 12 can include a service that involves hardware, software or a combination of hardware and software resources that can be utilized by the requestor 16. In order to access the resource, the requestor 16 provides a request that includes the ticket that it received from the authenticator. In addition to the signature generated by the authenticator 14, the ticket can also include validation parameters. The validation parameters can specify an identity of the requestor and be used to bind the ticket to a set of one or more services to which the requestor has been registered. That is, registration of the requestor with the service can be a prerequisite to authorize the requestor to utilize the service (e.g., a particular level of service) regardless of whether the ticket is valid. In this way, if the requestor 16 is not registered with the service (e.g., via a subscription), the requestor cannot utilize such service even if the requestor presents an authentic ticket. The registration of each requestor of a given resource 12 can be stored in the validation data 28 as part of the registration data 30.

Before establishing a session by which the requestor 16 can utilize the resource 12, the resource 12 employs a ticket evaluator 32 to determine whether the ticket is authentic. The resource 12 also determines whether the requestor 16 is authorized to utilize the resource. The ticket evaluator 32 thus can accept or reject the ticket presented by the requestor based on the contents of the ticket. The ticket evaluation 32 thus can involve multiple levels of evaluation. For example, the ticket can include a portion of the payload data that specifies an identification of the requestor 16. The ticket evaluator 32 can employ a requestor evaluator 34 to compare the requestor identity specified in the ticket relative to the registration data 30 (e.g., via a database lookup). Thus if the identity of the requestor as specified in the ticket has not been registered (e.g., subscribe to the resource 12), the ticket evaluator can reject the ticket and thereby prevent access to the resource 12.

A metadata evaluator 36 further can evaluate metadata contained in the payload data of the ticket to determine whether or not to grant access to the resource 12. The metadata evaluator 36, for example, may determine whether the ticket is valid or if the ticket has expired based upon temporal data provided in the ticket. The metadata evaluator 36 may also ascertain whether the credentials (e.g., user name or other identifier) provided by the requestor to the authenticator themselves remain valid or if they have expired or may have been revoked.

The ticket evaluator 32 can also include a signature validator 38 programmed to validate the signature that has been provided in the ticket by the authenticator 14. The signature validator 38 can employ a public key that is stored in the public key data 26 associated with the authenticator to determine if the signature provided in the ticket is valid. For example, the signature validator 38 can also apply validation parameters provided in the ticket to select the public key for the authenticator 14 and to select the appropriate decryption algorithm to analyze the signature to determine whether the signature is valid or invalid.

Additionally, the registration data 30 and/or ticket metadata further can enable the ticket evaluator 32 to ascertain what level of service to provide. For example, the ticket itself can include metadata or other information that includes a list of services or resources being requested. Access levels can also be specified in the ticket, which further can be compared relative to the registration data to ensure that the requested level of service is authorized.

Figure 2:
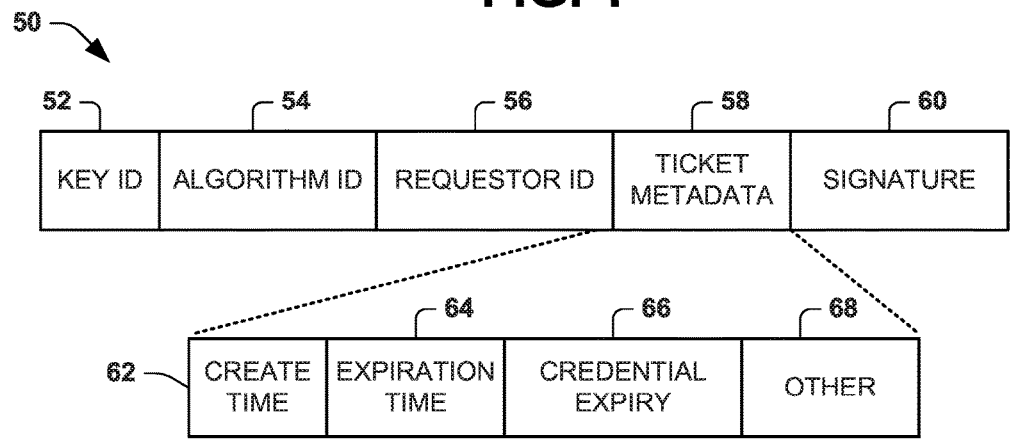
FIG. 2 depicts an example of a ticket that can be utilized to access resources.

FIG. 2 depicts an example of a ticket 50 that can be generated and redeemed for accessing one or more resources in a system, such as disclosed herein (e.g., resources 12 in system 10 of FIG. 1). The ticket 50 can include a plurality of fields generated according to a predefined schema. As an example, the ticket can include a key identifier (ID) 52 and an algorithm (ID) 54. The key ID 52 can specify a cryptographic key corresponding to the public key used to validate the signature. For instance, the signature validator 38 (FIG. 1) can access the corresponding key stored in the public key data 26 based upon the key ID 52. The algorithm ID 54 can specify which decryption algorithm to utilize for signature validation.

The ticket 50 can also include a requestor ID 56. The requestor ID 56 provides information to identify the requestor uniquely in the system. As mentioned, the requestor can be a user, device or other endpoint to which the ticket was issued such as disclosed herein. The configuration and content of the requestor ID thus can depend on the type of requestor. Examples of requestor IDs can include user name, active directory user name, serial number or certificates.

The ticket 50 can also include ticket metadata 58. The ticket metadata 58, for example, can include a creation time field 62, an expiration time 64, a credential expiry 66 as well as other metadata 68. Creation time data 68 can specify a time when the ticket was created in a predefined time zone or a coordinated universal time (UTC), for example. The expiration time 64 can specify when the ticket may expire, if at all. Thus, the authenticator 14 can determine the metadata to specify a time period during which the ticket can remain valid and utilized by a given requestor. The ticket metadata 58 can also include a credential expiry field 66, such as to indicate the period of time until expiration of the credential used to obtain the ticket (e.g., when the password provided by the requestor 16 expires). For instance, the credential expiry can indicate a number of days, hours or the like.

The ticket metadata 58 can also include other metadata 68 such as to specify a list of services that the requestor 16 wishes to access and/or a level of access that the requestor wishes to obtain for each of such services. Related requestor information associated with the ticket may also be inserted into the other metadata fields 58. Additional information, such as the latest time to which the ticket can be renewed may also be specified in the other metadata field 68. For instance, a ticket that has not yet reached its renew by time can be submitted to an authenticator to obtain a new ticket on behalf of the requestor for which the ticket was issued.

Figure 3:
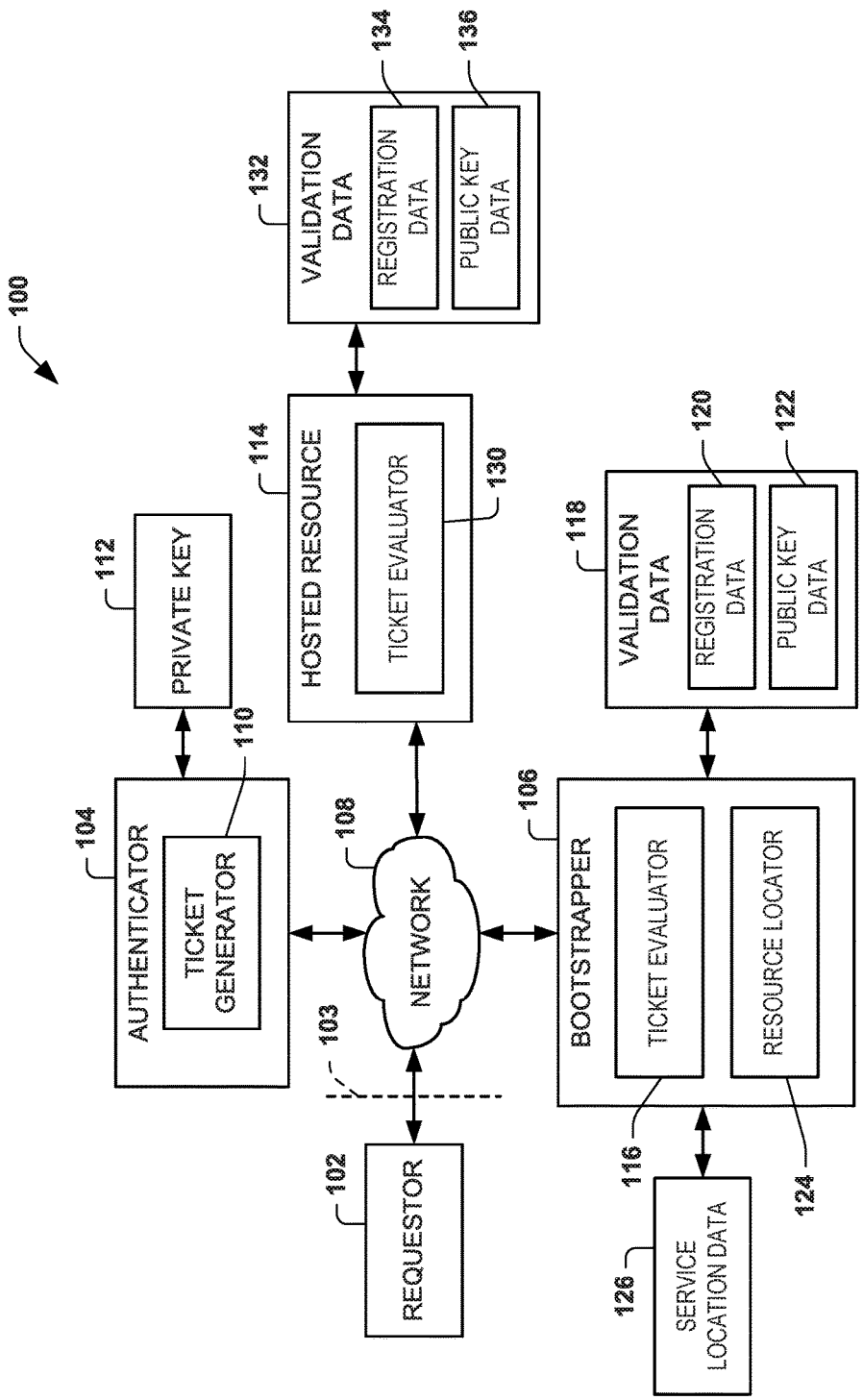
FIG. 3 depicts an example of another system that provides for distributed authentication of resources in a hybrid system.

FIG. 3 depicts an example of another configuration of a distributed authentication system 100 that can be utilized by one or more requestors 102 to access one or more hosted resources 114. As mentioned, a hosted resource corresponds to a resource (e.g., hardware, a service or both hardware and software) that is hosted by a third party, such as in a computing cloud. In the example of FIG. 3, the requestor 102 resides behind a firewall, demonstrated schematically by dashed line at 103. For example, the requestor can operate within a premise-based system that is separate from the hosted system where the hosted resource 104 resides. Also demonstrated in the sample FIG. 3, the system 100 includes a bootstrapper service 106, which itself can operate as another hosted resource in the system 100. The bootstrapper service 106 can be utilized by a given requestor 102 to ascertain a location (e.g., URL) of a resource being requested by the given requestor.

The system 100 operates in a similar manner to the system 10 of FIG. 1. For example, the requestor 102 employs an authentication API to request authentication and a ticket from an authenticator 104. For example, the authenticator 104 can reside in the same premise-based system in which the requestor resides. In other examples, the authenticator 104 can reside outside of the premise-based system. For example, if the authenticator 104 resides within the premise-based system with the requestor 102, the authenticator can provide a ticket to enable the requestor 102 to access both hosted resources 104 as well as premise-based resources (not shown in this example). In some examples, if the authenticator resides outside of the premise-based system, the authenticator may provide a ticket for redemption of hosted resources only. This is because the firewall 103 separates the requestor from the hosted resources to enable the premise-based system to operate autonomously without having to accept public keys for cloud authenticators. In other examples, a cloud authenticator can generate tickets that are useable with premises resources provided that the cloud authenticator's public keys have been registered with those premises resources.

By way of example, the requestor 102 submits its credentials in a request to the authenticator 104 via a communication link that includes a network 108 (e.g., via an authenticator API). The authenticator 104 includes a ticket generator 110 that it employs to generate a ticket for the requestor 102 in response to the request. The ticket generator 110, for example, can generate a ticket to include the payload and signatures data fields, such as shown in FIG. 2. The ticket generator 110 can employ the payload data (e.g., fields 52, 54, 56 and 58 of the ticket 15 of FIG. 2) and apply the payload fields to a private key 112 to generate the corresponding signature using an encryption algorithm. The resulting ticket can be returned to the requestor via the same or different communications link as part of its response.

In the example of FIG. 3, it is presumed that the requestor 102 wishes to access a service, but does not know the location (e.g., URI, URL) of the desired resource 114. Accordingly, the requestor 102 can provide a resource request to the bootstrapper 106. As mentioned, the bootstrapper 106 can operate as a service and thus is configured to redeem tickets presented by requestors. For example, the bootstrapper 106 includes a ticket evaluator 116 that is programmed to evaluate the ticket presented by the requestor 102 to determine whether to grant or deny access to its bootstrapping service.

The ticket evaluator 116 can be implemented similar to the ticket evaluator 32 of FIG. 1 (e.g., including requestor evaluator 34, metadata evaluator 36 and signature validator 38). The ticket evaluator 116 thus can evaluate the contents of the ticket being presented, including the identity of the requestor 102 that is specified in the ticket relative to validation data 118. The validation data 118 can include registration data 120 and public key data 122 such as disclosed herein. The ticket evaluator 116 thus can ascertain whether the requestor 102 is authorized (e.g., registered) to access the bootstrapper service 106 based upon the registration data 120. The ticket evaluator 116 can also determine whether the ticket is valid based on validating the signature of the ticket with respect to public key data 122. For instance, the ticket evaluator can employ a key ID and algorithm ID presented in the ticket to cryptographically validate the signature based on the payload of the ticket data.

If the ticket evaluator 116 determines that the ticket is valid for the bootstrapper service 106, including that the requestor's identity specified in the ticket is authorized to use the service (e.g., via registration data 120), the bootstrapper 106 can employ a resource locator 124 (its resource component) to ascertain a location in the system 100 corresponding to the requested service. For example, the resource locator 124 can be programmed to employ service location data 126 to look up the requested service and send a corresponding response to the requestor 104 via a secure communications link. The response thus can include an indication of the location for the hosted resource 114. The service location data 126 can be implemented as a database that is separate from the bootstrapper service 106 and from the authenticator 104 such that the service location data can be updated to reflect additional services and/or other types of resources that may be accessible in the system 100.

As a further example, the bootstrapper 106 can provide the response to the requestor in a format depending upon the format of the request that was received. For example, the response can include a request identifier associated with the request that was provided by the requestor as well as a URI or URL that specifies a location of the hosted resource 114 in the system 100. For example, the location can correspond to a secure location via HTTPS or another secure protocol through which the requestor 102 can access the hosted resource 114 via the network 108.

The requestor 102 can employ the location information specified in the response from the bootstrapper 106 to issue a corresponding request to the hosted resource 114. For example, the requestor 102 can employ the location data to issue a request for one or more hosted resources that also include the ticket that was generated by the authenticator. In some examples, the requestor 102 can submit the same ticket that was generated by the authenticator 104 to the bootstrapper to obtain the location as well as to the hosted resource 114. Thus, the ticket generated by the distributed authenticator 104 can be utilized by a given requestor 102 to access and utilize multiple services implemented in the system 100, demonstrated in the example of FIG. 3 as including bootstrapper 106 and hosted resource 114. Additionally, in examples where the authenticator 104 resides within the premise-based system (e.g., behind firewall 103) locally with respect to the requestor 102, the ticket can be utilized to access both premise-based resources as well as hosted resources 114 outside of the firewall 103.

The hosted resource 114 can redeem tickets to grant or deny access in response to the request from the requestor 102 in a manner similar to that disclosed with respect to FIG. 1 (and similarly to the bootstrapper 106). Briefly stated, the hosted resource 114 can include a ticket evaluator 130 that can evaluate and validate a ticket that is provided by the requestor in the request to the hosted resource 114. The hosted resource can employ validation data 132 that includes registration data 134 and public key data 136. The registration data 134 can correspond to data specifying identities of one or more resources to which access has been granted, such as disclosed herein. For instance, the registration data 134 thus can be established in response to completing subscription and payment terms of the provider of the hosted resource 114.

Thus, if the registration data 134 does not match that the identity of the requestor 102 provided in the ticket, the ticket evaluator 130 can reject the ticket and its associated request. The ticket evaluator 130 can also ascertain the validity of the ticket based on other ticket data, such as the expiry of the ticket and/or credentials of the user, which can be evaluated relative to the current time. If the ticket presented by the requestor has expired or if the requestor is otherwise not authorized to utilize the hosted resource 114, the ticket evaluator 130 can reject the associated request and refuse access to the resource 114.

The ticket evaluator 130 further can employ a signature validator to validate the signature provided in the ticket. For instance, the signature validator can employ a key ID and an algorithm ID provided in the ticket to determine which public key and algorithm to use for signature validation. The public key and algorithm can be applied to the signature and ticket payload to ascertain whether the signature is valid. If the signature is invalid the ticket evaluator can reject the ticket and the associated request. If the evaluation results in the ticket determined to be valid, the ticket evaluator 130 can utilize the ticket to initiate a corresponding session between the requestor 102 and the hosted resource 114. Although more than one level of resource utilization may be available for a given hosted resource 114, the level can be specified as part of the registration data 134 and/or based upon a service level request that is provided in the ticket itself (e.g., ticket metadata).

Figure 4:
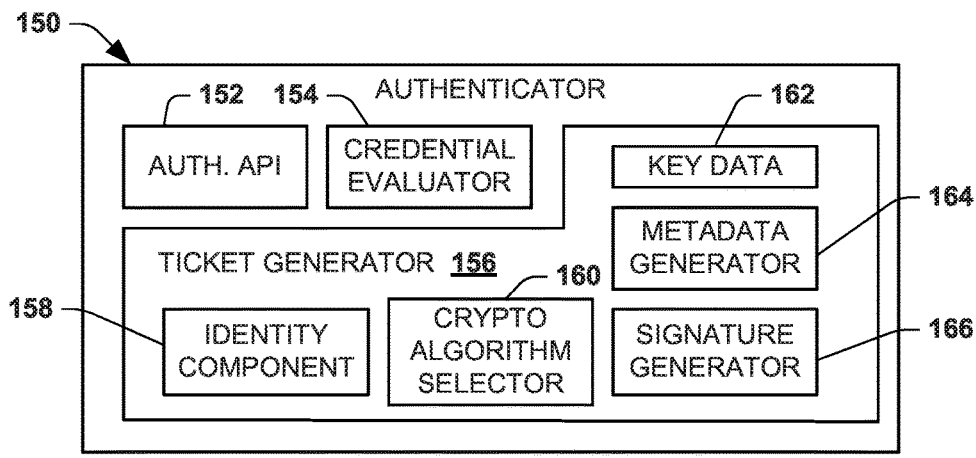
FIG. 4 depicts an example of an authenticator.

FIG. 4 depicts an example of an authenticator 150 that can be utilized to generate a ticket in response to a request, such as can be submitted via an authenticator API 152. The authenticator 150 may employ one or more authenticator APIs 152 to enable access to the authentication functions. The authenticators APIs 152 enable requestors to exchange credentials for tickets. As mentioned, the requestor credentials can be provided as part of credentials parameters in a request submitted to the authenticator 150 via a secure link.

The authenticator 150 can be implemented in a computing cloud as part of a hosted system. Additionally or alternatively, in other examples, the authenticator 150 can be implemented in a premise-based system. When the authenticator 150 is implemented within a premise-based system that includes a firewall to separate the premise system from external resources, the authenticator can supply its public key and other relevant cryptographic information to hosted resources via a secure communications link (e.g., HTTPS) or other secure channel. Alternatively, the information can be provided securely via a physical non transitory machine readable medium.

The authenticator 150 includes a credential evaluator 154. The credential evaluator 154 is programmed to evaluate credentials supplied by the requestor in the authentication request and to authenticate the requester. As an example, the credential evaluator 154 can accept user credentials via an http(s) POST request and, in some examples utilize third party authentication protocols, such as including Integrated Windows Authentication, Kerberos, NTLM and Security Assertion Markup Language (SAML). In some examples, the credential evaluator can implement single sign-on procedures, such as by utilizing LDAP and stored LDAP databases on a server. The approach here is not limited to utilizing any particular authentication method to accept credentials to verify the identity and authenticate the requestor with respect to the system.

Figure 5:
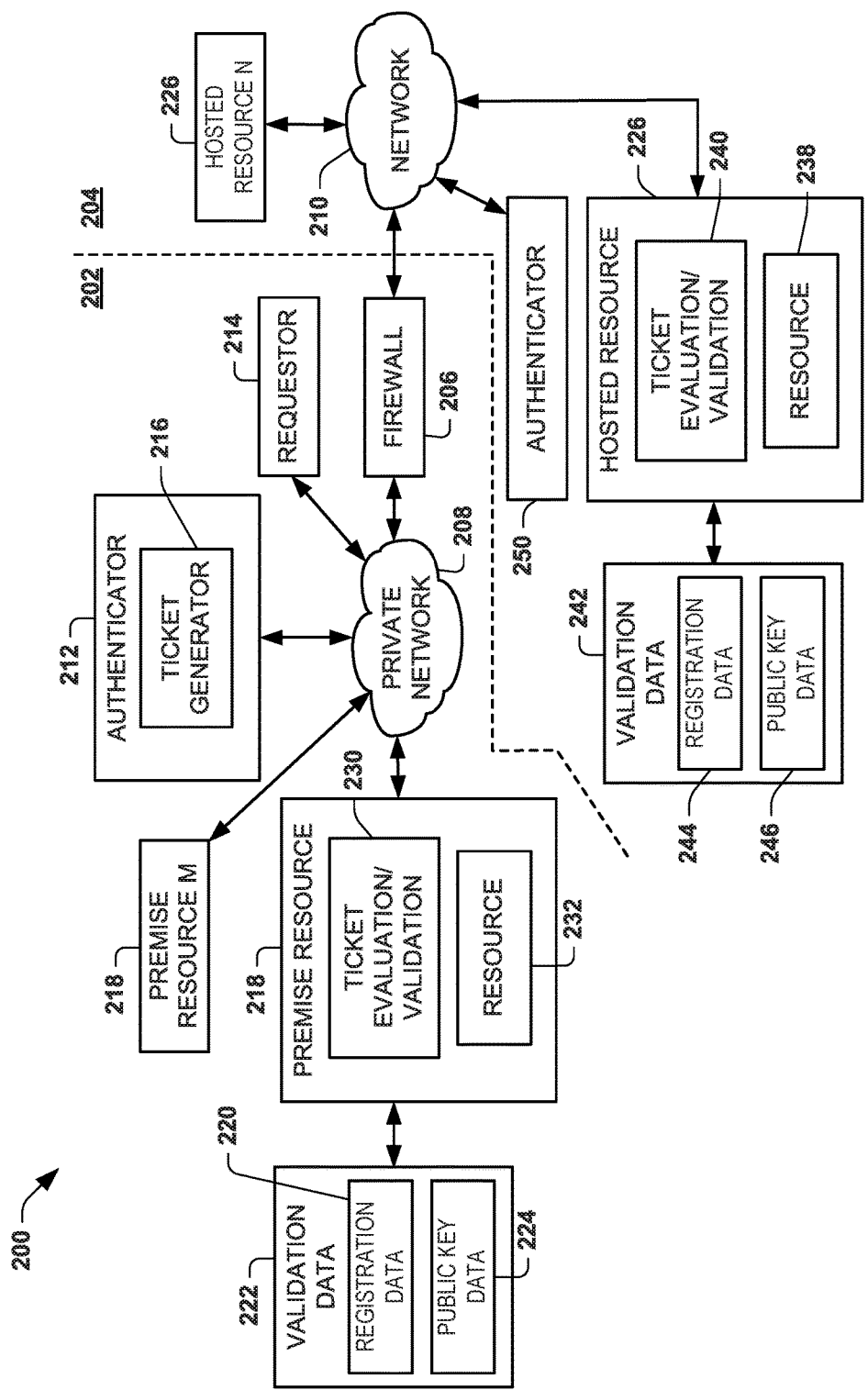
FIG. 5 depicts yet another example of a system that provides for distributed authentication of system resources.

The authenticator 150 also includes a ticket generator 156 such as can correspond to ticket generator 22, 110 or 216 of FIGS. 1, 3 and 5, respectively. The ticket generator 156 includes a plurality of components programmed for generating the information that is arranged in a manner to collectively define the ticket (e.g., see FIG. 2). For example, the ticket generator 156 can include an identity component 158 that can ascertain the identity of a requestor based on evaluations of the credentials of such requestors (e.g., by credential evaluator 154). The identity component 158 thus can determine and specify a value (e.g., a string or integer value) corresponding to the requestor ID (e.g., requestor ID 56) of the resulting ticket.

The ticket generator can also include a cryptographic selector 160 programmed to specify a cryptographic algorithm and public key according to the approach utilized by the ticket generator 156 to sign the ticket. For example, each authenticator 150 can employ a respective encryption algorithm and private key for generating the signature. The encryption ID thus can specify a particular encryption algorithm, such as a publicly available to proprietary algorithm, which the ticket generator employs to generate the signature. The private key can be stored as key data 162 associated with the authenticator 150. The key data 162 can identify a public verification key that is associated with the ticket generator 156 and can be utilized to decrypt the corresponding signature that it had generated. The public key of the authenticator 150 thus is to be provided (e.g., via a secure communication link) to each resource (e.g., service) that is adapted to redeem tickets generated by the authenticator 150 or otherwise be retrieved based on the key ID specified in the ticket.

The ticket generator 156 may also include a metadata generator 164 to generate metadata (e.g., metadata 58) that is to be part of the ticket payload such as disclosed herein. The metadata generator 164 can specify attributes and parameters associated with the ticket that is being generated, about the identity of the requestor for which has been generated and/or about one or more services that the requestor wishes to access. For example the metadata generator 164 can generate metadata that can specify time of ticket creation, expiration of the ticket, expiration of the credentials of the user. Additionally or alternatively, the ticket metadata can specify information associated with the services being requested, including a level of access that is being requested from one or more ticket redeeming services.

The ticket generator 156 also includes a signature generator 166 to generate the signature based upon other parts of the payload that is part of the ticket. For example, the signature generator 166 can employ ticket payload data that includes the key identifier, algorithm identifier, requestor ID and the ticket metadata for generating the signature. Since the signature is generated based upon the payload that is specified in the ticket that is being generated, white spaces and other information in the ticket should be preserved so that the payload object remains consistent throughout the system in which the ticket is utilized and redeemed. Thus, the requestor, resources as well as all transport mechanisms that may store, transmit or redeem tickets should preserve the ticket in its original format and content to ensure that it remains consistent throughout its lifecycle.

FIG. 5 depicts an example of another system 200 that implements distributed authentication. The system 200 demonstrated in FIG. 5 is a hybrid system includes a premise-based system 202 that is separate from an external hosted system 204. The hosted system 204 can be hosted by one or more third parties and corresponds to a set of resources (e.g., services, including hardware and/or software) available to endpoints and other resources operating in the premise-based system 202, such as disclosed herein. The hosted resources can be provided by one or more third party providers to supplement services available within the confinement of the premise-based system, which is a tenant of the hosted system.

In the example of FIG. 5, premise-based resources operating behind the firewall 206 demonstrated behind one side of the dashed lines resources external to the firewall are demonstrated at 204 on the other side of the dashed line. Isolation between tenants of the hosted system 204 (e.g., a multi-tenant system) thus can performed via access control mechanisms disclosed herein and the firewall 206 between such controls and the hosted system 204. With the introduction of isolation, the multi-tenant architecture is effectively transformed to a single-tenant architecture that includes dynamically dedicated cloud resources that can be utilized seamlessly for users of each premise-based system 202. In other examples, the firewall 206 can be omitted and the traffic control can be controlled by the access control mechanisms disclosed herein.

By way of further example, the premise-based system 202 can leverage services of the hosted system 204, such as may include a cloud based PBX and/or cloud based UC system, to provide additional services and capabilities to users or other entities operating in the premise-based system (e.g., a premise-based PBX/UC system). For example, a cloud service provider can provision, administer, and bill for services that are provided to one or more premises systems and their respective users. With a minimal amount of setup, users or other entities that are generally administered and based at the premises can take advantage of specific cloud based services for which they have been authorized. In this way, local resources of the premises based system can remain in a given state or condition, and users of such premises system can employ a network connection (e.g., via a secure communications link) with remote hosted resources (e.g., services and/or hardware implemented in a multi-tenant cloud) to access and utilize, seamlessly, additional resources (e.g., cloud resources). For example, the hosted resources can include different yet complimentary resources from those implemented within the premises based system and/or the resources can be duplicative (e.g., redundant or backup resources) to those in the premises based system such as to increase capacity of those in the premises based system. As an example, the resources operating in a multi-tenant hosted cloud system can include a mobility router service, a fax service, a voicemail transcription service, a hosted conferencing bridge, a hosted instant messaging server, a hosted contact center and/or other communications service hosted as part of the multi-tenant hosted system.

In the example of FIG. 5, the premise-based system includes an authenticator (e.g., corresponding to authenticator 150) 212 that can operate behind the firewall 206 for authenticating one or more requestors 214 such as can correspond to users, devices, or software operating in the premise-based system 202. The authenticator 212 can include a ticket generator 214 that can be utilized to generate a ticket for the requestor 214 in response to the credentials of the requestor submitted to the authenticator 212, such as disclosed herein. The authenticator 212 thus can provide a response to the requestor 214 that includes the ticket (e.g., ticket 50) that has been generated. For example, the authenticator 212 (e.g., a premise authenticator) can accept premise credentials from the requestor and generate tickets that can be used in both premise system 202 and the hosted system 204, provided that premise authenticator and the requestor have been registered with the hosted system. In this way, the requestor (e.g., a user, a device and/or software) can utilize a single sign-on (e.g., username and password or other credentials) to provide access to both premise and hosted resources.

The requestor 214 can employ the ticket to access premise resources 218, which can include one or more resources 1 through M, where M is an integer denoting the number of premise-based resources. In other examples, the requestor can access authorized premise resources via other access control mechanisms without presenting the ticket. The premise resources 218 can correspond to services (e.g., hardware and/or software) implemented within the premise based system 202. The requestor 214 can be registered to utilize one or more premise resources 218 and, in some examples, itself could be a premise-based resource. The registration of the requestor 214 to authorize use of the resources can be stored in registration data 220 that is part of the validation data 222 such as disclosed herein. The validation data 222 can also include public key data 224.

As disclosed herein, the requestor 214 can also leverage resources that are external to the premise-based system 202. As one example, requestor 214 can leverage resources of the hosted system 204 to provide additional services and capabilities. There can be any number of hosted resources 226, demonstrated as hosted resource 1 through N where N is a positive integer denoting the number of hosted resources 226. For example, a cloud service provider can provision, administer, and bill for services implemented in the hosted system 204 and are provided to one or more premises systems and their respective users based on a subscription or registration process, such as disclosed herein. Thus, the ticket generated by the authenticator behind the firewall based upon the credentials by the requestor 214 can provide a ticket that can be redeemed by resources operating inside the premise-based system 202 as well as the hosted resources 226 operating external to the firewall in the hosted system 204.

Each of the resources 218 and 226 can redeem tickets presented by the requestor 214 as disclosed herein. Briefly stated, the premise resources can each include a ticket evaluation/validation component 230 programmed to validate tickets presented for granting access to the respective resource. The premise resources also include corresponding resource components 230, which can include hardware/software for determining the particular function of that resource.

As an example, the ticket evaluation/validation component 230 can access the registration data 220 of the validation data 222 to determine whether the particular requestor 214 (based upon the requestor ID in the ticket) is authorized to utilize the given resource 218. For example, the premise resource can compare the requestor ID in the ticket with the corresponding registration data to see if there is a match. A match can indicate that the requestor may be authorized to utilize the resource. Additionally, the ticket evaluator/validation component can evaluate the ticket itself to ensure the ticket is still valid such as based upon an expiry time of the ticket for accessing the given resource 218. The ticket evaluation/validation component 230 can also validate the signature based on public key data 224 as disclosed herein.

As mentioned, once the requestor 214 has a ticket from the authenticator 212, that requestor can use that ticket multiple times and with multiple different resources, including both premise resources 218 and hosted resources 226. For example, the requestor 214 can provide the ticket in a request over a secure communication link via the private network 208, firewall 206 and network 210 to a corresponding hosted resource 226. In this way, the requestor can utilize hosted resources, such as may include a cloud based PBX and/or other services implemented in a cloud based UC system.

As disclosed herein, some resources can be implemented as bootstrapper services to provide an indication of a location for redirecting a requestor to the location of an ultimately requested resource. In other examples, the hosted resource 226 can itself include other resources that can be utilized by the requestor once the ticket has been validated. For instance, to evaluate the ticket, each of the hosted resources 226 can employ ticket evaluation/validation components 240 that can operate as disclosed herein based on information (e.g., payload and signature data) provided in the ticket and validation data 242 that can include both registration 244 and public key data 246. The ticket evaluation/validation component 240 thus can establish a session with the requestor 214 for utilizing its resource component 238 in response to validating the ticket presented by the requestor.

In addition to or as an alternative to the premise authenticator 212, in some examples, the hosted system 204 can also include an authenticator 250 that can be utilized by a requestor 214. For example, the requestor 214 can employ an authenticator API (not shown) or other access methods to provide its credentials to the authenticator 250 in exchange for a ticket that can be utilized for accessing hosted services 226. In some examples, in order to avoid having to send data into the premise-based system and thereby maintaining integrity of the firewall, the ticket provided to the requestor 214 by the authenticator in the hosting system 204 can be limited for redemption by the hosted resources 226 and not available to be redeemed by premise resources 218. In other examples, public keys of cloud authenticators can be registered with the premises system to enable tickets issued by such authenticators to be utilized to access premise-based resources.

Figure 6:
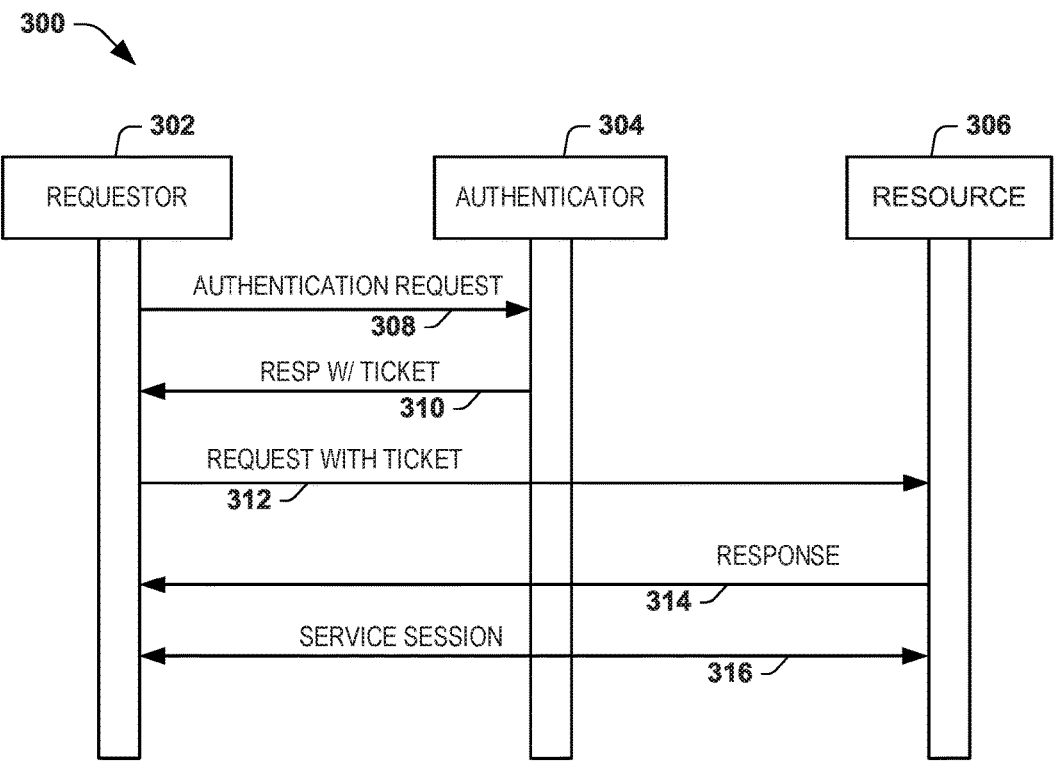
FIG. 6 depicts an example of a signaling diagram demonstrating a method of distributed authentication.
Figure 7:
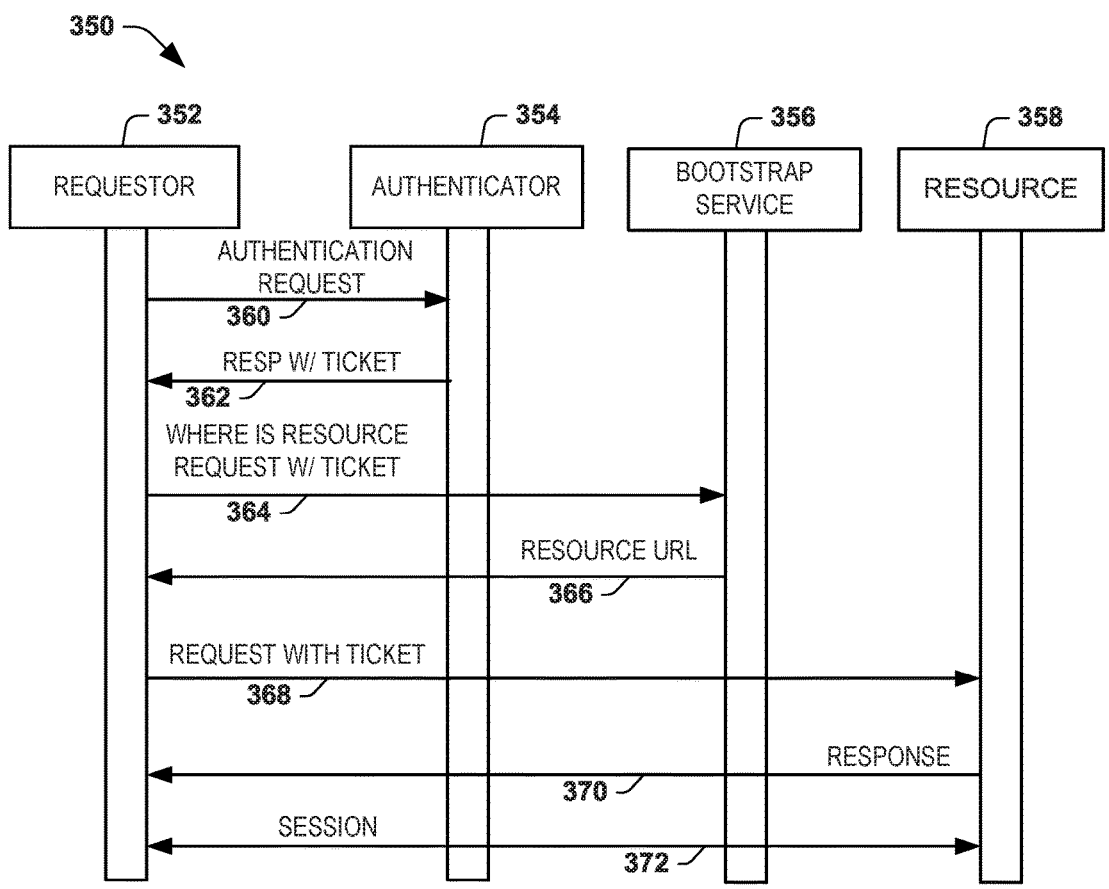
FIG. 7 depicts an example of another signaling diagram demonstrating a method of distributed authentication including bootstrapping.

In view of the foregoing structural and functional features described above, methods that can be implemented will be better appreciated with reference to signaling diagrams of FIGS. 6 and 7. While, for purposes of simplicity of explanation, the methods of FIGS. 6 and 7 are shown and described as executing serially, it is to be understood and appreciated that such methods are not limited by the illustrated order, as some aspects could, in other examples, occur in different orders and/or concurrently with other aspects from that disclosed herein. Moreover, not all illustrated features may be required to implement a method. The methods or portions thereof can be implemented as instructions stored in a non-transitory machine readable medium as well as be executed by a processor of one or more computer devices, for example.

FIG. 6 depicts a signaling diagram 300 depicting an example of a method for authenticating and validating a request for services in a system, such as can correspond to any of the systems disclosed herein (e.g., see FIGS. 1, 3 and 5). By way of context, the signaling diagram 300 can be implemented by an exchange of information between a requestor 302, an authenticator 304 and a resource 306, each of which can operate as disclosed herein with respect to FIGS. 1-5. Accordingly, additional information about such components can be obtained with reference to such other figures.

The requestor 302 provides an authentication request to the authenticator 304, demonstrated at 308. As disclosed herein, the authentication request can include credentials of the requestor 302, which can vary depending on the type of requestor (e.g., a user, a device or an application). The authenticator 304 processes the authentication request and generates a corresponding ticket, such as disclosed herein. The authenticator provides a response with the ticket back to the requestor, as demonstrated at 310. The requestor can store the ticket in memory for use in requesting services, which can be premise-based and/or hosted services.

The requestor 302 can send a request with the ticket from the authenticator 304 to the resource (e.g., corresponding to resource 12, 114, 218, 226), as demonstrated at 312. The resource can evaluate and validate the ticket and provide a corresponding response, as demonstrated at 314. If the ticket is rejected, the requestor cannot access the resource 306. If the ticket is validated (not rejected), a session can be established between the requestor and the service, as demonstrated at 316, thereby enabling the requestor to utilize the resource. The level of utilization can vary according to registration data stored at the resource (e.g., according a predetermined service contract) and/or based on service request level provided in the ticket provided with the request at 312.

In some examples, the location of the resource may be unknown to the requestor, but can be discovered by sending a location request to a bootstrapper service. FIG. 7 thus depicts a signaling diagram 350 of an example of a method for authenticating and validating a request for services that need to be discovered via a bootstrapping service 356. Similar to FIG. 6, the signaling diagram 350 can be implemented in a system, such as can correspond to the functions disclosed herein (e.g., see FIGS. 1, 3 and 5), and includes an exchange of information between a requestor 352, an authenticator 354, a bootstrapping service 356 and a resource 358.

The requestor 352 provides an authentication request to the authenticator 354, demonstrated at 360. As disclosed herein, the authentication request can include credentials of the requestor 352, which can vary depending on the type of requestor (e.g., a user, a device or an application). The authenticator 354 processes the authentication request and generates a corresponding ticket, such as disclosed herein. The authenticator 354 provides a response with the ticket to the requestor, as demonstrated at 362. The requestor 352 can use the generated ticket for requesting services.

The requestor 352 can send a request with the ticket from the authenticator 354 to the bootstrap service (e.g., corresponding to bootstrapper 106) 356, as demonstrated at 312. The location request can include an identification of one or more services that the requestor 352 wishes to access. In response to evaluating and validating the ticket (e.g., determining the ticket to be valid), the bootstrap service 356 can perform a look-up for each requested service and provide a response that includes data specifying a location (e.g., URL) of each requested service, as demonstrated at 366. The validation of the ticket at this stage does not guarantee that the requestor 352 is authorized to utilize the resource 358, but merely indicates that it is authorized to receive location information. If the ticket does not authorize the requestor to utilize the bootstrap service 356, the bootstrap service can reject the ticket and provide a corresponding response at 366.

At 368, the requestor 352 can provide the ticket to the location specified in the response at 366 for the requested service 358. The resource 358 can evaluate and validate the ticket and provide a corresponding response, as demonstrated at 370. If the ticket is rejected, the requestor cannot access the resource 358. If the ticket is validated (not rejected), parameters can be provided in the response at 370 to establish a session between the requestor and the service, as demonstrated at 372, thereby enabling the requestor to utilize the resource. As mentioned, the level of utilization can vary according to registration data stored at the resource (e.g., according a predetermined service contract) and/or based on service request level provided in the ticket provided with the request at 368.

Figure 8:
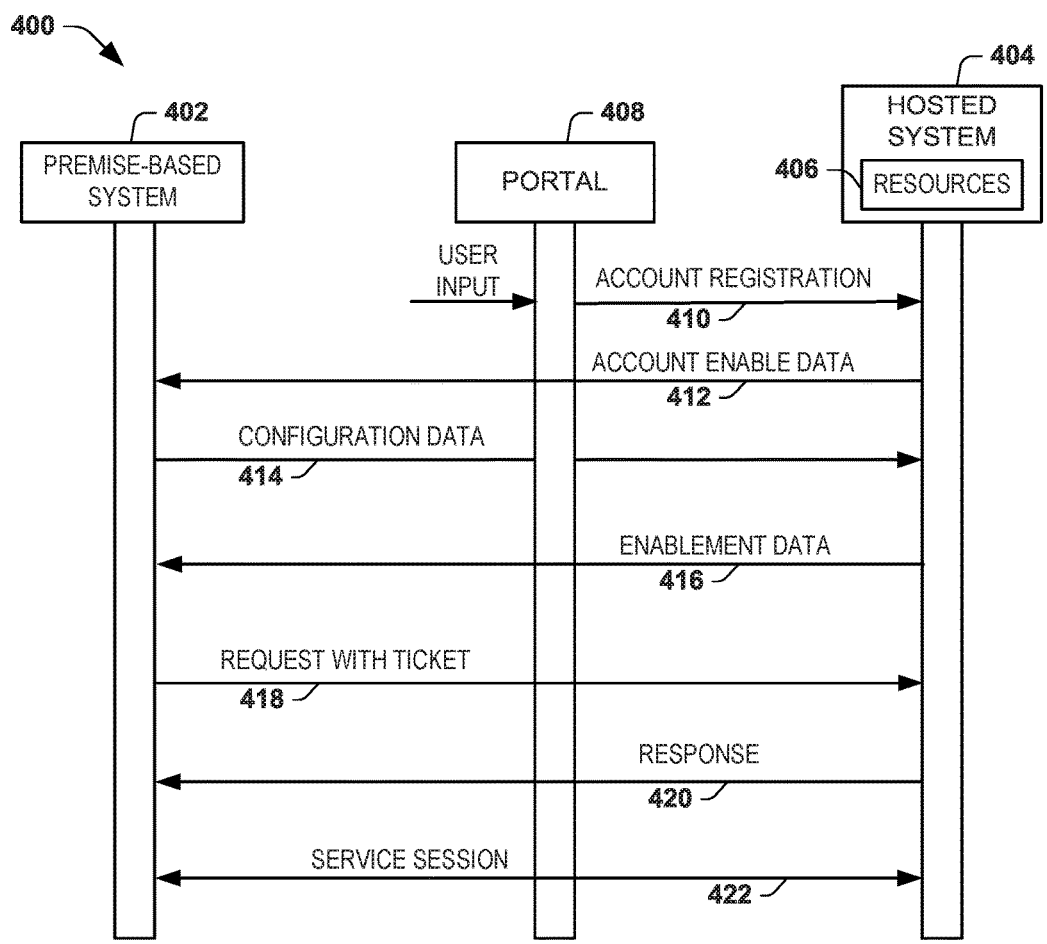
FIG. 8 depicts an example of another signaling diagram demonstrating a method of registration in combination with distributed authentication.

FIG. 8 depicts an example of another signaling diagram 400 demonstrating registration of an authenticator (e.g., authenticator 14, 104, 150, 212) that is implemented in a premise-based system 402 in combination with distributed authentication of a requestor (e.g., user). As mentioned, a premise-based authenticator can register with a hosted system 404 to enable a requestor to present tickets issued by such authenticator to be redeemed for accessing hosted resources 406. The hosted system 404 and its resources can be managed and controlled by another entity (e.g., hosted in a cloud or by a separate peer entity) separate from the management and control of the premise-based system 402. The premise based system and its users can be considered customers of the hosted system.

In the example of FIG. 8, the registration can be integrated with purchasing or subscribing to services that are external to a firewall of a premises system. For instance, an authorized person (e.g., an administrator, an officer or the like) can agree to the terms of service, which can specify subscription parameters (e.g., service plan, level and types of service, number of users, payment terms) as well as provide payment information or any other form of authorization required to establish and sign up for the service(s).

As an example, an authorized user of the premise-based system 402 can log into a portal 408 to register the premise-based system for hybrid operation with the hosted system 404 according to corresponding terms of service. For instance, the authorized user can be provided (in response to signing up for hosted services) a predetermined resource location corresponding to the portal 408. The portal 408 can provide a secure communication link that is part of or affiliated with the hosted system 404. The user can input (user input at 410) an initial set of credentials, such as can include a user name and password. In response to the user input, the premises based system can be registered (at 412) by establishing an associated account for authorizing the premises based system for hybrid operation with the hosted system 404. As mentioned, the associated account can be established in response to purchasing and/or subscribing to services in the hosted system 404.

In response to the account registration (at 410) of the premise-based system 402, the hosted system 12 can provide account enable data (at 412) that is provided to the premises based system 14. The account enable data can be provided to an administrator or other authorized person within the premises based system, such as in a message (e.g., email, SMS message or the like) provided to the authorized person or to a data storage location in the configuration system. For example, the account enable data can include a location and access rights for the resources 406 that can be accessed within the hosted system 12 according to terms of service.

At 414, the premises based system 14 can provide configuration data to the hosted system 12 via the network portal 30. The configuration data can include configurations, properties and user data for each of the plurality of users in the premises based system 402. As disclosed herein, the configuration data 414 can include certificates (e.g., a public key) for each authenticator in the premise-based system that can authenticate users and generate tickets to be redeemed for accessing the hosted resources 406.

The configuration data 414 can also include an entire list of users and user groups for the premises system can be provided to the network portal (e.g., as disclosed in the above-incorporated application Ser. No. 14/011,787). The configuration data, including the public key certificate for authenticators, can be stored in a configuration database in the hosted system 404, and be pushed to the set of resources 406 according to account terms established at 410. Thus, if the account terms change (e.g., new services are added or deleted from the subscription or the level of services changes), such changes can be propagated to such resources to selectively enable or disable access to such services.

At 416, the hosted system 404 provides enablement data to premise system 402 in response to the configuration data. The enablement data can include key IDs assigned by the hosted system 404 to each of the certificates (e.g., public keys provided in the configuration data). Thus, a key ID can be assigned to each registered certificate to uniquely identify the certificate that is registered to operate in the system 400. The key ID also enables the ongoing management of registered authenticators' certificates (e.g., for updating and/or deleting of certificates) within the system 400. The enablement data can also specify which resources have been enabled for each user and each identified group of users. By specifying or assigning resources in relation to a respective group, as a user might move from one group to another, the resources for the current group can be dynamically modified for a respective user according to the user's current group. Additionally, by configuring the hosted system 404 to control the enablement of resources (e.g., as the source of truth regarding enablement) and in turn providing corresponding enablement data to the premise-based system 402, conflicts can be avoided reducing complexity of the implementation at both the premise-based and hosted systems.

Once the configuration data has been provided to the hosted system 404 and stored in the configuration database and enablement data has been distributed to the premises system, a requestor (e.g., user) can provide a request with a ticket (e.g., as generated by a premise authenticator—see e.g., FIG. 6 or 7) to the resource 406 (e.g., corresponding to resource 12, 114, 226) in the hosted system 404, as demonstrated at 418. The resource 406 can evaluate and validate the ticket based on the public key and certificates and provide a corresponding response, as demonstrated at 420. If the ticket is rejected, the requestor cannot access the resource 406. If the ticket is validated (not rejected), a session can be established between the requestor and the service, as demonstrated at 422, thereby enabling the requestor to utilize the resource. The level of utilization can vary according to registration data stored in the configuration database (e.g., according a predetermined service contract) and/or based on service request level provided in the ticket provided with the request at 418.

In some examples, the configuration data, including public keys and relevant certificates can be uploaded via the portal 408 at the time of account registration (410). As mentioned new premise servers can be added or changed, the new certificates and associated public keys for each authenticator further is sent to the hosted system via the portal 408 or another secure communications link. Similarly, if a server containing an authenticator is deleted, the associated certificate can be removed via the portal 408 or other secure link according to the key ID associated with such certificate. Further updates and/or revocation of certificates can be implemented via the portal, such as if certificates are regenerated or modified. Additionally, the portal or another secure communications link can expose the ability to revoke authenticator certificates for the appropriate roles, as well as to re-upload premise authenticator certificates for a given tenant. The management of certificates and registration of the authenticators in the hosted system can be controlled based on the key ID that has been assigned for each certificate.

Additionally, authorized users can access the portal 408 in response to a user input to provision various resources for the hybrid users of the premises based system 402. The user input can be provided by the user to the network portal (e.g., via a web browser) or it can be provided from a GUI implemented at the premises based system. For example, the configuration data (e.g., initially or subsequently provided) can assign hosted resources to each of the users individually. Alternatively or additionally, hosted resources can be enabled for users according to a group to which each respective user currently belongs. In this way, existing work groups can be leveraged from the premises based system and utilized for enabling services.

As can be appreciated by those skilled in the art, portions of the invention may be embodied as a method, data processing system, or computer program product (e.g., a non-transitory computer readable medium having instructions executable by a processor). Accordingly, these portions of the invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable non-transitory computer-readable medium may be utilized including, but not limited to, static and dynamic storage devices, hard disks, optical storage devices, and magnetic storage devices.

Certain embodiments are disclosed herein with reference to flowchart illustrations of methods, systems, and computer program products. It can be understood that blocks of the illustrations, and combinations of blocks in the illustrations, can be implemented by computer-executable instructions. These computer-executable instructions may be provided to one or more processor cores of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing core) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
a cloud-based authenticator programmed to:
receive an authentication request from a requestor, the authentication request specifying credentials for the requestor,
authenticate the requestor based on the credentials for the requestor, and
provide a response to the requestor, the response comprising a ticket redeemable for accessing resources operating in a hybrid system, the ticket including payload data and a signature encrypted based on a private key generated by the authenticator, and
a ticket evaluator associated with a given resource of the resources, the ticket evaluator being programmed to:
select a public key for the authenticator based on a key identifier specified in the payload data of the ticket,
decrypt the signature of the ticket by applying the public key to the ticket to provide a decrypted signature,
validate the ticket provided in a request from the requestor to access the given resource according to validation parameters stored in the payload data, and
grant the requestor access to the given resource in response to validating the ticket.

2. The system of claim 1, wherein the resources comprise at least one premise-based resource and at least one cloud-based resource.

3. The system of claim 1, wherein the ticket evaluator is at least partially cloud-based.

4. The system of claim 1, wherein the cloud-based authenticator further comprises:
an authenticator API to receive the authentication request from the requestor, the authentication request including the credentials of the requestor;
a credential evaluator to evaluate the credentials of the requestor to determine if the requestor is authorized to operate in the hybrid system; and
a ticket generator to generate the ticket in response to the credential evaluator determining that the requestor is authorized to operate in the hybrid system.

5. The system of claim 4, wherein the ticket generator employs key data to identify the public key for the ticket, wherein the identity of the public key is provided in the payload data.

6. The system of claim 1, wherein the ticket is a transparent ticket that does not allow the resources access to sensitive data on a premise system.

7. The system of claim 1, further comprising another ticket evaluator associated with another resource of the resources, wherein the other ticket evaluator is programmed to receive from the requestor another request to access the other resource, the other request comprising the ticket, the other ticket evaluator to grant or deny the requestor access to the other resource based on validating the ticket by the other resource in response to the other request.

8. The system of claim 7, wherein the other resource comprises a bootstrapper service and the other request comprises a location request for a location of the given resource, the bootstrapper service providing the location of the given resource in a response to the requestor in response to the other ticket evaluator determining that the validating the ticket to grant the requestor access to the bootstrapper service, the requestor providing the request to the location of the given resource that is provided in the response from the bootstrapper service.

9. A method comprising,
receiving, at a cloud-based authenticator, an authentication request from a requestor, the authentication request specifying credentials for the requestor,
authenticating, at the cloud-based authenticator, the requestor based on the credentials for the requestor, and
providing, at the cloud-based authenticator, a response to the requestor, the response comprising a ticket redeemable for accessing resources operating in a hybrid system, the ticket including payload data and a signature encrypted based on a private key generated by the authenticator,
wherein the ticket is used to authenticate the requestor for access to one or more resources operating in the hybrid system, and
wherein the resources operating in the hybrid system comprise both premise-based resources and cloud-based resources.

10. The method of claim 9, wherein the ticket is a transparent ticket that does not allow the resources access to sensitive data on a premise system.

11. A method comprising:
receiving, at a cloud-based authenticator, an authentication request from a requestor, the authentication request specifying credentials for the requestor;
authenticating, at the cloud-based authenticator, the requestor based on the credentials for the requestor;
providing, at the cloud-based authenticator, a response to the requestor, the response comprising a ticket redeemable for accessing resources operating in a hybrid system, the ticket including payload data and a signature encrypted based on a private key generated by the authenticator,
wherein the ticket is used to authenticate the requestor for access to one or more resources operating in the hybrid system;
receiving, by a ticket evaluator associated with a given resource of the resources, a request for the requestor to access the given resource, wherein the request comprises the ticket;
validating, by the ticket evaluator, the ticket based on parameters stored in payload data of the ticket,
wherein the parameters stored in the payload data comprise a key identifier that is used to select a public key to match with the public key of the ticket; and
granting, by the ticket evaluator, the requestor access to the given resource in response to validating the ticket.

12. The method of claim 11, wherein the validating further comprises:
selecting, by the ticket evaluator, the public key based on the key identifier, and
decrypting, by the ticket evaluator, the signature by applying the public key to the ticket.

13. The method of claim 11, wherein the ticket evaluator is at least partially cloud-based.

14. A method comprising
receiving, at a cloud-based authenticator, an authentication request from a requestor, the authentication request specifying credentials for the requestor;
authenticating, at the cloud-based authenticator, the requestor based on the credentials for the requestor;
providing, at the cloud-based authenticator, a response to the requestor, the response comprising a ticket redeemable for accessing resources operating in a hybrid system, the ticket including payload data and a signature encrypted based on a private key generated by the authenticator,
wherein the ticket is used to authenticate the requestor for access to one or more resources operating in the hybrid system;
receiving, by a ticket evaluator associated with a given resource of the resources, a request for the requestor to access the given resource, wherein the request comprises the ticket;
receiving, by another ticket evaluator associated with another resource of the resources, a request for the requestor to access the other resource, wherein the request comprises the ticket; and
granting, by the other ticket evaluator, the requestor access to the other resource in response to validating the ticket,
wherein the other resource comprises a bootstrapper service and the other request comprises a location request for a location of the given resource, the bootstrapper service providing the location of the given resource in a response to the requestor in response to the other ticket evaluator determining that the validating the ticket to grant the requestor access to the bootstrapper service.

15. The method of claim 14, wherein the requestor providing the request to the location of the given resource that is provided in the response from the bootstrapper service.

16. The method of claim 14, wherein the resources operating in the hybrid system comprise at least one premise-based resource and at least one cloud-based resource.

* * * * *